United States Patent
Barau et al.

(10) Patent No.: US 9,600,667 B2
(45) Date of Patent: Mar. 21, 2017

(54) METHOD FOR DETECTING AN ATTEMPTED ATTACK, RECORDING MEDIUM, AND SECURITY PROCESSOR FOR SAID METHOD

(75) Inventors: Emmanuel Barau, Versailles (FR); Olivier Granet, Suresnes (FR); Patrick Soquet, Paris (FR)

(73) Assignee: VIACCESS, Paris la Defense (FR)

( * ) Notice: Subject to any disclaimer, the term of this patent is extended or adjusted under 35 U.S.C. 154(b) by 935 days.

(21) Appl. No.: 13/378,709

(22) PCT Filed: Jun. 23, 2010

(86) PCT No.: PCT/EP2010/058949
§ 371 (c)(1),
(2), (4) Date: Dec. 16, 2011

(87) PCT Pub. No.: WO2011/000756
PCT Pub. Date: Jan. 6, 2011

(65) Prior Publication Data
US 2012/0096547 A1    Apr. 19, 2012

(30) Foreign Application Priority Data
Jun. 29, 2009 (FR) .................................. 09 54431

(51) Int. Cl.
G06F 21/71     (2013.01)
G06F 21/55     (2013.01)

(52) U.S. Cl.
CPC ............ *G06F 21/554* (2013.01); *G06F 21/71* (2013.01)

(58) Field of Classification Search
CPC ....................................................... G06F 21/71
USPC ............................................................. 726/22
See application file for complete search history.

(56) References Cited

U.S. PATENT DOCUMENTS 5,533,123 A        7/1996  Force et al.
2004/0250124 A1*  12/2004  Chesla et al. ................. 713/201

FOREIGN PATENT DOCUMENTS

EP    1447976    8/2004
EP    1575293    9/2005
FR    2907930    5/2008

* cited by examiner

*Primary Examiner* — Jacob Lipman
(74) *Attorney, Agent, or Firm* — Occhiuti & Rohlicek LLP

(57) ABSTRACT

This method in which an attempt to attack a security processor is detected by the security processor itself comprises:
measurements (50) of several different events occurring independently of one another in the absence of attack attempts,
:building (52) the value of at least one attack indicator as a function of at least one index of concomitance between at least two different events measured, the index of concomitance representing the temporal proximity between the two different events measured, and
detecting (54) an attack attempt if the value of the attack indicator crosses a predetermined threshold.

9 Claims, 2 Drawing Sheets

|    | C1  | C2    | C3 | C4 | C5 | C6 | C7    | C8    | C9 | C10 |
|----|-----|-------|----|----|----|----|-------|-------|----|-----|
| C2 |     | 0     | 0  | 0  | 0  | 0  | 0     | 0     | 0  | 0   |
| C3 | 100 |       | 0  | 0  | 0  | 0  | 0     | 0     | 0  | 0   |
| C4 | 100 |       | 50 | 0  | 0  | 0  | 0     | 0     | 0  | 0   |
| C5 |     |       |    | 1  | 0  | 0  | 0     | 0     | 0  | 0   |
| C6 |     |       |    |    | 1  | 0  | 0     | 0     | 0  | 0   |
| C7 |     | 20000 |    |    |    |    | 0     | 0     | 0  | 0   |
| C8 |     | 20000 |    |    |    |    | 10000 | 0     | 0  | 0   |
| C9 |     |       |    |    |    |    |       |       | 0  | 0   |
| C10|     | 4000  |    |    |    |    | 2000  | 2000  |    | 0   |

| $S_1$ | $CM_1$ |
|-------|--------|
| $S_2$ | $CM_2$ |
| $S_3$ | $CM_3$ |
| $S_4$ | $CM_4$ |

METHOD FOR DETECTING AN ATTEMPTED ATTACK, RECORDING MEDIUM, AND SECURITY PROCESSOR FOR SAID METHOD

CROSS REFERENCE TO RELATED APPLICATIONS

This application is the national stage entry under 35 USC 371 for PCT/EP2010/058949, filed Jun. 23, 2010, which claims the benefit of the Jun. 29, 2009 priority date of French Application No. 0954431. The contents of both the foregoing applications are incorporated herein by reference.

FIELD OF INVENTION

The invention pertains to a method by which an attempt to attack a security processor is detected by the security processor itself. An object of the invention is also an information-recording medium as well as a security processor to implement this method.

BACKGROUND

Security processors are generally hardware components containing confidential information that only legitimate users can use. Examples of such confidential information include cryptographic keys and access rights. To preserve the confidentiality of this information, these processors are designed to be as robust as possible against attack attempts by computer hackers. In one example, a security processor is a chip card equipped with an electronic processor.

Security processors are subjected to different types of attack. Some of these attacks are aimed at extracting or determining the confidential information contained in the security processor. To this end, a multitude of attacks have been developed. For example, certain of these attacks seek to obtain an abnormal functioning of the security processor by making it process messages built by computer hackers. Other more invasive methods try to disturb the functioning of the security processor at key moments in its operation by playing on its supply voltage or again by means of a laser beam directed towards the security processor.

Other types of attack do not seek to extract or determine the confidential information contained in the security processor but consist simply of the abusive use of this security processor. For example, in pay television, control sharing and card sharing come under this type of attack. Control sharing consists of the sharing of the control word deciphered by the security processor among several receivers. These receivers can then decipher the scrambled multimedia contents with this control word, even though only one receiver has actually paid for a subscription.

In card-sharing, the same security processor is made to decipher several enciphered control words coming from different receivers. As above, all these receivers can then descramble the scrambled multimedia contents whereas only one of these receivers is entitled to access the content.

To combat these attacks, there are known ways of detecting attack attempts and, in response to this detection, to execute countermeasures.

One example of a method for detecting attack attempts and for executing countermeasures in response is described in the patent application EP 1 575 293.

A countermeasure is an action aimed at preventing an attack against the security processor from being long-lasting or successful. There are a large number of countermeasures that can be executed by a security processor. These measures range from a simple increase in security measures in the security processor up to the definitive and irreparable blocking of the security processor, which then becomes unusable.

Methods for detecting an attack attempt have already been proposed. These methods comprise: measuring several different events occurring independently of one another in the absence of attack attempts, followed by comparing each measurement with a predetermined respective threshold to detect the presence or absence of an attack attempt.

However, a difficulty arises from the fact that the events representing an attack attempt can also occur when there is no attack attempt. It is therefore necessary to prevent the production of false detections of attack attempts because these false alarms may result in the untimely execution of countermeasures, which then inconvenience the legitimate user of the security processor. For this reason, there are known ways of choosing a far higher value for the predetermined threshold than the values of all the measurements that can be obtained when there are no attacks. However, raising the predetermined threshold makes certain attacks undetectable or slows down the detection of an attack attempt.

SUMMARY

The invention seeks to overcome this problem by proposing a method for detecting an attack attempt. The method comprises building a value of at least one attack indicator as a function of at least one index of concomitance between at least two different measured events measured, the index of concomitance representing the temporal proximity between the two different events measured; and detecting an attack attempt if the value of the attack indicator crosses a predetermined threshold.

The above method takes account of the temporal proximity between different events occurring in the security processor. This enables the swifter detection of an attack attempt or the detection of an attack attempt that could not be detected by observation of the measurement of a single event.

Indeed, it can happen that the measurement of each of these events, taken individually, does not constitute a speedy representation of an attack attempt since these events occur during a normal operation of the security processor. On the contrary, the fact that these events occur almost concomitantly, instead of occurring independently of one another as they normally would, can suggest, with a high degree of confidence, that an attack attempt has taken place. The above method therefore enables the security processor to swiftly detect, with a high degree of confidence, the fact that it has been the victim of an attack attempt. The execution of appropriate countermeasures can then be activated with greater speed.

In some practices, the method includes building the value of the attack indicator out of several indices of concomitance from different measured events, and weighting the importance of these indices of concomitance relative to one another using a predetermined set of weighting coefficients.

In other practices, the method includes building several attack indicator values using different sets of weighting coefficients between the same indices of concomitance, each set of weighting coefficients being predetermined so as to be more sensitive to an attack attempt that is different from the ones to which the other indicators are more sensitive.

In yet other practices, the method includes setting the weighting coefficient of a same index of concomitance to be the same in all the sets of weighting coefficients used to build the different attack indicator values;

Among the practices of the invention are those that include limiting the measurement of an event to a sliding time slot so as to avoid taking into account events that have occurred outside this time slot, this being done so to establish the fact that the events are concomitant in the measurement of this time slot;

Also among the practices of the invention are those that include detecting, as at least one of the events measured, an error in the functioning of the security processor, each occurrence of which leads the security processor to stop the processing operations in progress and to automatically reset to resume these operations from the start;

Yet other practices feature the step of counting, in a counter, of the number of times that a type of event has occurred, the value of the counter constituting the measurement.

Additional practices include the step of obtaining the index of concomitance between at least two measurements by multiplying these measurements with one another.

An advantage of the invention arises from the use of weighting coefficients between the indices of concomitance. This provides a simple way to modify the sensitivity of an attack indicator built to a particular type of attack by modifying the value of these weighting coefficients.

Another advantage arises from the use of several different sets of weighting coefficients. These make it possible, in using the same set of indices of concomitance, to build several attack indicators, each one of which is dedicated to the detection of a different kind of attack attempt.

Yet another advantage arises from the systematic use of the same weighting coefficient for the same index of concomitance. This limits the quantity of memory required to store these different weighting coefficients.

Another advantage arises from limiting the measurement of an event to a sliding time slot. Doing so limits the number of false detections of attack attempts caused by the accumulation over time of measured events when there are no attack attempts.

Another advantage arises from causing the security processor to be reset when one of the measured events is the detection of an error of the security processor. This increases security through prevention of the untimely blocking of this security processor.

The invention also includes an information-recording medium comprising instructions for executing the above method when an electronic computer executes these instructions.

The invention also includes a security processor comprising: registers in which there are stored measurements of several events occurring independently of one another in the absence of attack attempts; and a computer capable of building the value of at least one attack indicator as a function of at least one index of concomitance between at least two different events measured, the measurements of which are stored in the registers, this index of concomitance representing the temporal proximity between the two different events measured, and detecting an attack attempt if the value of the attack indicator crosses a predetermined threshold.

BRIEF DESCRIPTION OF THE DRAWINGS

The invention will be understood more clearly from the following description, given purely by way of a non-restrictive example and made with reference to the appended drawings of which.

DETAILED DESCRIPTION

In these figures, the same references are used to designate the same elements.

Here below in this description, the characteristics and functions well known to those skilled in the art shall not be described in detail. Furthermore, the terminology used is that of systems for conditional access to multimedia contents. For more information on this terminology, the reader may refer to: "*Functional model of a conditional access system*" EBU Review—Technical, European Broadcasting Union, Brussels, BE, No 266, 21 Dec. 1995.

Figure 1:
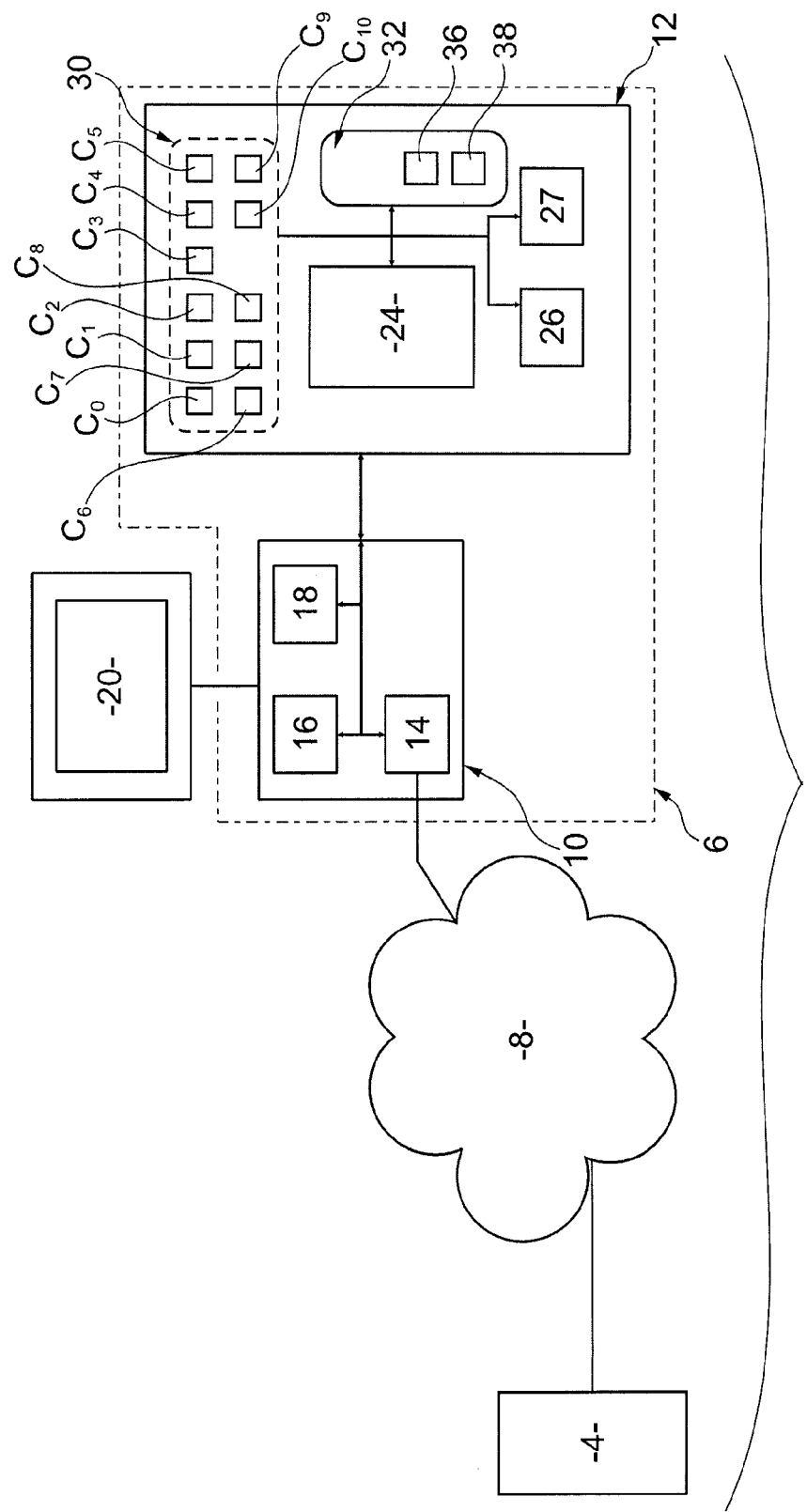
FIG. 1 is a schematic illustration of a system for transmitting scrambled multimedia contents that comprises a security processor.

FIG. 1 represents a system for subscriber broadcasting of multimedia contents. For example, the system 2 broadcasts several scrambled television channels. The descrambling of each of these television channels or groups of television channels is conditional upon the payment of a subscription by subscribers. In this description, the terms "scramble"/"encipher" and "descramble"/"decipher" are considered to be synonymous.

The system 2 has at least one transmitter 4 of scrambled multimedia contents and a multitude of receivers 6 capable of descrambling the multimedia content broadcast by the transmitter 4. To simplify FIG. 1, only one receiver 6 has been shown. The other receivers are identical to the receiver 6.

The receiver 6 is connected to the transmitter 4 by a long-distance information-transmitting network 8. The network 8 may be a wireless communications network or a wired network such as the Internet.

Typically, the transmitter 4 broadcasts multiplexed scrambled multimedia contents with ECM (Entitlement Control Message) and EMM (Entitlement Management Message) type control messages. Each ECM message comprises at least one cryptogram CW* of a control word CW used to descramble the scrambled multimedia content.

The receiver 6 has a decoder 10 and a security processor 12 connected detachably to the decoder 10.

The decoder 10 has a receiver 14 of the data transmitted by the transmitter 4 connected to a demultiplexer 16. The demultiplexer 16 demultiplexes the data received and transmits the scrambled multimedia content to a descrambler 18 and the ECM or EMM messages to the security processor 12.

The processor 12 receives the cryptogram CW* and deciphers this cryptogram in order to send the control word CW in unencrypted form to the descrambler 18. This deciphering is permitted only if the access rights contained in the ECM correspond to the access rights stored in the security processor 12. In some embodiments, the processor 12 is the processor of a chip card.

The descrambler 18 descrambles the scrambled multimedia content by means of the control word CW deciphered by the security processor 12. The descrambled multimedia content is then, for example, displayed in unencrypted form on a screen 20 so that the displayed multimedia content is directly perceptible and comprehensible to the user.

The functions and characteristics of the processor 12 for performing the different operations related to the deciphering of the control word CW are known and shall not be described herein in greater detail.

The processor 12 has an electronic computer 24 connected to a voltage sensor 26, a light sensor 27 and a set 30 of registers.

The voltage sensor 26 has a voltage transducer capable of converting the voltage at the processor 12 into a piece of digital data that can be exploited by the computer 24.

The light sensor 27 comprises a light transducer capable of converting the photons of a laser beam directed to the processor 12 into digital data that can be exploited by the computer 24.

By way of an illustration, the set of registers 30 comprises eleven registers referenced $C_0$ to $C_{10}$. Each of the registers $C_1$ to $C_{10}$ is designed to contain a measurement of an event that may be activated by an attack attempt on the processor 12.

The measured events may also occur in the absence of attack attempts. However, when there is no attack attempt, these measured events occur independently of one another. Thus, it is improbable that the measured events will occur concomitantly when there is no attack attempt.

The term "concomitantly" designates the fact that these events occur during a same time slot. One time slot is associated with each measured event. This time slot may have a finite duration or, on the contrary, an infinite duration. In the case of a finite duration, events that occur outside the time slot are not taken into account in the measurement of this event.

In one example, a time slot of finite duration is a sliding time slot. This sliding time slot has a finite duration that is shifted as and when time elapses, so that only the most recent events are taken into account for the measuring of the event. An infinite duration means that all events, starting with the time of activation of the measurement of this event, are taken into account for the measurement.

In the illustrated example, the measurement of an event consists of counting the number of times in which the event has occurred during the time slot associated with the event. Thus, each of the registers contains a number representing the number of occurrences of the same event. Consequently, here below in the description, the registers $C_1$ are called counters $C_1$.

There are a large number of measurable events. Typically, the measured events come under one of the following categories: (1) normal events that a legitimate user can activate but that, if they occur in large numbers, represent an abnormal use of the processor 12, (2) reception by the processor 12 of erroneous or unnecessary images, i.e. messages that do not exist during normal and error-free use, and (3) detection of errors in the functioning of the processor 12.

There are many errors of functioning. Example of such errors include errors in the execution of the code of the processor's operating system, an abnormal situation measured by the voltage sensor 26 or the light sensor 27, errors of integrity discovered in processed data, etc. In general, detection of operating errors results in interrupting the processing operations in progress and automatically resetting the processor 12.

An example of events measured for each counter shall now be described in detail.

A first counter, $C_1$, contains the number of times in which a command for consulting data from the processor 12 has been received. A certain number of pieces of data contained in the processor 12 can be freely consulted. For example, there are commands for consulting the processor's identification number, or for consulting access rights recorded in the processor 12. Receiving a consultation command is therefore a normal event, at least as long as it remains occasional. However, a large number of commands for consulting data in the processor 12, if received within a short period of time, may be caused by an attack attempt.

A second counter, $C_2$, indicates a presence of unusual rights recorded in the processor 12. An unusual right is a right that the operator of the system 12 does not normally use.

For example, most operators never record a right in the security processor 12 for which the duration of validity is greater than one year. Therefore, a right recorded in the processor 12 with a duration of validity greater than one year, for example a right with an infinite duration of validity, is an unusual right, even if this possibility is technically provided for.

Similarly, an operator would normally never record a right authorizing access to and deciphering of all multimedia contents in the security processors. Thus, the registration of a right permitting access to all multimedia contents in the processor 12 would be considered to be an unusual right. The recording of an unusual right in the processor 12 may arise from an operator error. But it may also be evidence of an attack attempt.

A third counter, $C_3$, counts messages received by the processor 12 that have no functional utility for the processor. Examples of such messages with no functional utility include: (1) a message for consulting data that is non-existent in the processor 12; (2) a message for erasing a non-existent piece of data (for example, an access code, etc.) in the processor 12, and a message that reads, from the processor 12, the same piece of data that has just been read by an immediately preceding message.

These non-functional messages are syntactically correct. Therefore, they do not prompt any execution error in the processor 12. However, they are unnecessary. An operator may have erroneously sent such an unnecessary message. However, these unnecessary messages may also be evidence of an attack attempt, particularly if they are received too often.

A fourth counter, $C_4$, counts the number of syntax errors in the messages transmitted to the processor 12, i.e. in the ECM and EMM messages transmitted to this processor. The syntax, or structure, of the ECM and EMM messages complies with a predetermined grammar. The processor 12 can therefore detect syntax errors count and count how many times they occur in the fourth counter $C_4$. These syntax errors can arise from operator error. But they can also be evidence of an attack attempt.

Normally, a command should not have to be replayed several times. A fifth counter, $C_5$, counts these replayed commands. Replaying of a command consists of sending the security processor 12 the same command several times. For example, the command may be an updating message for updating certain pieces of data recorded in the processor 12. In this case, the processor 12 can detect the replay of this command by recording the date of the last updating message.

A sixth counter, $C_6$, counts the number of integrity errors detected in the messages received by the processor 12. Messages received by the processor 12 contain both data and a cryptographic redundancy for that data. This enables the processor 12 to check that there is no error in the data received.

For example, redundancy in data may be obtained by integrating a signature or a CRC (Cyclic Redundancy Check) of the data contained in this message. Errors in the data contained in the message may be evidence that the message encountered a disturbance as it traversed the network 8, or even within the decoder 10. But erroneous data can also be evidence of an attack attempt.

The seventh counter $C_7$, counts the number of integrity errors in data pieces contained in the processor 12. A certain number of data pieces recorded in the processor 12 are associated with a cryptographic redundancy used to check the integrity of the respectively recorded data pieces. It is possible for such errors to arise from a cause that lacks mischief, such as an electromagnetic disturbance. However, erroneous data recorded in the processor 12 can also be evidence an attack attempt.

The eighth counter $C_8$ counts the number of bad branches during execution of the processor's operating system code. A bad branch is an untimely or erroneous jump in an instruction executed by the processor 12 to another instruction. These bad branches in the execution of the code may be detected by executing the same instructions on the same pieces of data twice in succession. If the two executions of the code do not give the same result, this means that there has been a bad branch. Untimely jumps from instructions in the code executed by the processor 12 may arise from an attacker who is manipulating the processor's supply voltage of the processor 12, or who is directing a laser beam toward the processor 12.

A ninth counter $C_9$, counts the number of times that the data retrieval procedure is executed after the processor 12 has been wrenched out. Wrenching a processor 12 out means removing the processor 12 from the decoder 10 during operation. This interrupts the power supply to the processor 12 during data processing. The data retrieval procedure makes it possible, after such a power cut, to return the processor 12 to the state in which it was just before the power cut.

It is possible for the processor 12 to accidently be wrenched out of the decoder 10. However, untimely cuts in power supply to the processor 12 are also frequently used during an attack attempt to prevent the execution of countermeasures by the processor 12. Thus, the wrenching out of a processor 12 can also be evidence of an attack attempt.

A tenth counter, $C_{10}$, counts the number of times that the voltage sensor 26 measures abnormal power supply plus the number of times that the light sensor 27 detects light, such as light from a laser beam. Both abnormal voltages as and the presence of a laser beam are typical of an attack attempt on the processor 12. However, these sensors 26 and 27 can also detect abnormal voltage or the presence of a laser beam from causes that involve no mischief. These may occur, for example as a result of an accidental electromagnetic disturbances caused by an apparatus in the vicinity of the processor 12, even in the absence of an attack attempt. For example, merely powering on the decoder 12 can cause the voltage sensor 26 to detect an abnormal voltage.

Unlike all the other counters, a zeroth counter, $C_0$, counts events that occur only during normal operation of the processor 12 and that cannot be caused by an attack attempt. One example of an event counted by the zeroth counter $C_0$ is the number of ECM and EMM messages properly processed by the processor 12.

The value of the zeroth counter $C_0$ limits the temporal memory of certain previous counters to a sliding time slot with finite duration.

In one example, this is achieved by subtracting the value of the zeroth counter $C_0$ from the value of the $i^{th}$ counter where i>0, and using only the difference between these two counters, brought to 0 if it is negative, to compute an index of concomitance as described further below.

For example, except for the value of the counters $C_8$ and $C_{10}$, only the difference between the values of the counters $C_i$ and $C_0$ is used to compute indices of concomitance. Through the use of the value of the zeroth counter $C_0$, any events that have occurred outside the sliding time slot thus defined are ignored in the procedure for detecting an attack attempt. The duration of the sliding time slot defined by the zeroth counter $C_0$ is not constant and depends on the use made of the processor 12.

The computer 24 is connected to a memory 32 containing the different pieces of data and instructions needed for the functioning of the processor 12. In particular, the memory 12 comprises: instructions needed to compute the method of FIG. 4 when those instructions are executed by the computer 24, a matrix 36 of weighting coefficients, and a table 38 of warning thresholds.

Figures 2, 3, 4:
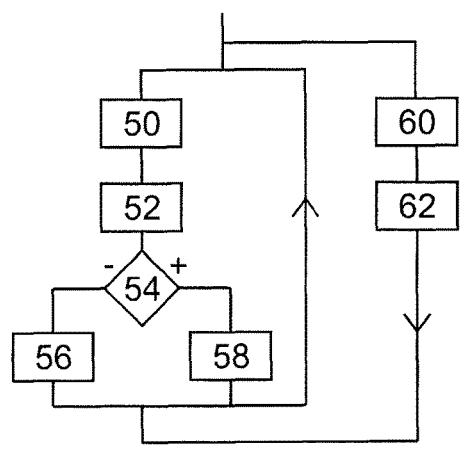
FIG. 2 is a schematic illustration of a matrix of weighting coefficients used by the security processor of the system of FIG. 1.
FIG. 3 is a schematic illustration of a table of warning thresholds used by the security processor of FIG. 1.
FIG. 4 is a flowchart of a method for detecting an attack attempt on the security processor of the system of FIG. 1.

An example of a matrix 36 is represented in greater detail in FIG. 2. This matrix 36 contains as many pieces of data as there are event counters liable to be activated by an attack attempt. In the example described herein, the matrix 36 has ten columns, each of which is associated with a counter $C_1$. The matrix 36 also contains nine rows associated respectively with the counters $C_2$ to $C_{10}$.

The cell situated at the intersection of the $i^{th}$ column from the left and the $j^{th}$ row from the top contains a weighting coefficient $m_{i,j}$ associated with an index of concomitance $C_i C_{j+1}$.

An index of concomitance $C_i C_{j+1}$ is an index computed from the value of the counters $C_i$ and $C_{j+1}$ that gives an indication of the concomitance between the events counted by the counter $C_i$ and those counted by the counter $C_{j+1}$. In the embodiment described herein, each index of concomitance is built so that its value becomes higher as a large number of events, measured respectively by the sensors $C_i$ and $C_{j+1}$, occur in proximity at the same instant. To this end, in this embodiment, each index of concomitance $C_i C_{j+1}$ corresponds to the product of the values of the counters $C_i$ and $C_{j+1}$ at the same point in time.

The table of warning thresholds 38 illustrated in FIG. 3 comprises a first column containing four warning thresholds $S_1$ to $S_4$. Each warning threshold is a numerical value. Warning thresholds are classified in rising order from top to bottom in the table 38.

The table 38 also has a second column associating one or more countermeasures, denoted as $CM_i$, with each threshold $S_i$. The countermeasures are actions executed by the security processor 12 that are designed to make it more difficult to extract or determine data contained in the processor 12 or to wrongfully use the security processor 12.

In the illustrated example, the countermeasures $CM_i$ associated with the threshold $S_i$ are less strict and entail fewer penalties for the user of the processor than those associated with the higher warning threshold $S_{i+1}$. Thus, the higher the warning threshold $S_i$ crossed, the stricter will be the countermeasures $CM_i$ executed in response.

By way of an illustration, the countermeasure $CM_1$ includes adding redundancy to the additional branching of the code to be executed by the processor 12. For example, such redundancy is obtained by executing the conditional branch several times, and checking that the result obtained is the same at each execution.

The countermeasure $CM_1$ also includes adding redundancy to the operations for checking the integrity of the processed data. For example, if the threshold $S_1$ is crossed, the integrity of the data is verified several times. If the threshold $S_1$ is not crossed, the integrity of the data is verified only once. The countermeasure $CM_1$ also includes checking the integrity of data whose integrity would not have been checked if the threshold $S_1$ had not been crossed.

The countermeasure $CM_2$ includes adding restrictions to the possibilities of stringing instructions of the code executed by the processor 12. This can be obtained by forcing the processor 12 to execute a full block of instructions without allowing any interruption between the execution of the instructions of this block.

The countermeasure $CM_2$ also includes eliminating certain functions of the processor 12 that would have been permitted if the threshold $S_2$ had not been crossed. For example, if the threshold $S_2$ is crossed, adding new services, such as addition of a new operator or a new subscriber, or accessing the administrative functions of the processor 12 would be prohibited.

For example, the countermeasure $CM_3$ includes modifying the weighting coefficients present in the matrix 36 so that the upper threshold, i.e. $S_4$ is easily and speedily reached when events are measured. Thus, as described with reference to FIG. 4, this increases the sensitivity of the processor 12 to the detection of an attack attempt. The countermeasure $CM_3$ also includes the systematic and duplicate checking of the integrity of each message received. The countermeasure $CM_3$ can also include boosting controls on the execution flow. This may include causing each portion of an executable code to be executed twice by the processor 12 and comparing the results end of these two executions to confirm that they are the same. If they are not, the counter $C_8$ is incremented.

Finally, the countermeasure $CM_4$ definitively invalidate the processor 12 so that it is definitively unusable. This can be achieved, for example, by erasing the confidential information contained in the processor 12.

The functioning of the processor 12 shall now be described in greater detail with reference to the method of FIG. 4.

Along with its normal operation, the processor 12, also executes a method for detecting an attack attempt. To this end, at a step 50, the processor 12 measures events likely to have been caused by an attack attempt. This measurement includes counting corresponding events in the counters $C_i$.

Then, during step 52, the processor 12 builds three attack indicators, $I_1$, $I_2$ and $I_3$ respectively.

The first attack indicator, h, is conceived so as to be more sensitive to attack attempts using laser disturbance than the remaining attack indicators $I_2$ and $I_3$. An attack by laser disturbance includes pointing a laser beam at the security processor to prompt instruction jumps in the code executed by this processor at key moments in its execution. The key moments typically correspond to conditional branches.

Here, the value of the indicator $I_1$ is given by the following relationship:

$$I_1 = m_{2,6}C_2C_7 + m_{2,7}C_2C_8 + m_{2,9}C_2C_{10} + m_{7,7}C_7C_8 + m_{7,9}C_7C_{10} + m_{8,9}C_8C_{10}$$

where $m_{i,j}$ is the weighting coefficient, the value of which is contained in the matrix 36.

The second attack indicator, $I_2$, is designed to be more sensitive to logic attacks than the other two indicators. A logic attack includes searching for a logical flaw or an implementation error in the code executed by the processor 12 that can be exploited to trigger abnormal behavior in the processor 12. For example, a logic attack could include sending a very large number of erroneous messages to the processor 12, all of which differ from one another, until one of these messages prompts abnormal behavior in the processor 12.

For example, the value of the indicator $I_2$ is built by the following relationship:

$$I_2 = m_{1,2}C_1C_3 + m_{1,3}C_1C_4 + m_{3,3}C_3C_4$$

Finally, the third attack indicator, $I_3$, is designed to be more sensitive to DPA (Differential Power Analysis) attack attempts. A DPA attack is an attack in which the attacker sends a large number of messages to the processor 12 to prompt a large number of executions of cryptographic algorithms on a large number of different pieces of data. At the same time, the attacker measures the consumption of current by the processor 12. Then, through a statistical analysis on the data collected, the attacker can discover the values of the keys or confidential data recorded in the processor 12.

For example, the third attack indicator $I_3$ is built by means of the following relationship:

$$I_3 = m_{4,4}C_4C_5 + m_{4,5}C_4C_6 + m_{5,5}C_5C_6.$$

Then, once the value of the attack indicators $I_1$ to $I_3$ has been built, in step 54, the value of these attack indicators is compared with the different warning thresholds recorded in the table 38 to detect an attack attempt.

If none of these indicators has had its value cross the threshold Si then, in step 56, no countermeasure is executed.

Conversely, if the value of one of these indicators crosses one of the thresholds $S_j$, then a countermeasure associated with the highest crossed threshold $S_i$ is executed in step 58.

At the end of steps 56 and 58, the method returns to step 50.

At the same time as steps 50 to 58, during step 60, the transmitter 4, using, for example, an EMM or ECM type message, transmits new values for the weighting coefficients. Then, in step 62, the processor 12 receives this message and updates the values of the weighting coefficients contained within the matrix 36.

The updating of the weighting coefficients makes it possible to easily modify the sensitivity of an indicator to a particular attack attempt. In particular, to modify this sensitivity of the indicator to a particular attack attempt, it is necessary only to modify the weighting coefficients recorded in the matrix 36 without it being necessary to modify other instructions executable by the processor 12.

Many other embodiments are possible. For example, the processor 12 can include several different matrices of weighting coefficients. Each of these matrices can be used to compute a respective attack indicator. This then makes it possible to assign each index of concomitance a different weighting coefficient as a function of the attack indicator built. The use of several weighting coefficient matrices can also be useful for modifying the weighting matrix used when a new warning threshold is crossed.

Conversely, a single attack indicator can be built instead of several indicators.

As a variant, there are as many warning threshold tables as there are attack indicators built. In this variant, the warning thresholds associated with one particular attack indicator are not necessarily the same as the warning thresholds associated with another attack indicator.

The table 38 can also be replaced by a single warning threshold associated with countermeasures.

One of the counters $C_i$ can simply account for the existence of an event without counting the number of occurrences of this event. In this case, the value of this counter is encodable by a single bit. Even in this case, the value of the existence counter can be associated with a time slot of infinite or finite duration.

Sensors other than those described can be implemented in the processor 12. For example, the processor 12 can also include a temperature sensor.

The index of concomitance is not limited to the product of two measurements. For example, it may also correspond to a product of more than two measurements. However, the increase in the number of measurements multiplied together also increases the size of the matrix of weighting coefficients.

It is also possible to compute an index of concomitance representing the time proximity between at least two events by mathematical operations other than a multiplication.

Many countermeasures other than those indicated here above can be executed in response to the crossing of a warning threshold by one of the attack indicators. For example, other countermeasures may include modifying the cryptographic algorithm executed by the processor 12. A countermeasure can also include the use of or the measurement of many events to build an attack indicator that hitherto was not measured. For example, in response to the crossing of a warning threshold, the events measured by one of the sensors 26 or 27 can be counted, whereas they were not counted previously.

The computer 24 can be formed by one or more processors. For example, the computer 24 can be formed by a processor with which there is an associated co-processor. The method of detection can then be executed both by the processor and by the co-processor.

The measurement has been described here in the particular case where the number of occurrences of an event has to be counted. However, the measurement can also consist of the recording, in one of the registers, of the value of an event such as for example a value measured by one of the sensors 26 or 27. To count the number of occurrences of an event, the value of the counters can also be decremented instead of being incremented as described here above.

The architecture of the receiver 6 is herein illustrative solely of a particular situation. In particular, the descrambler 18 can also be detachable. Conversely, the descrambler and the security processor can be implemented without any degree of freedom in the decoder. In this case, the descrambler and the security processor can take the form of software components.

The invention claimed is:

1. A method for detecting, by a security processor, an attempt to attack said security processor, said method comprising measuring events occurring independently of each other in absence of attack attempts; obtaining at least one index of concomitance between at least two measurements by multiplying said measurements by one another, said at least one index of concomitance representing a temporal proximity between at least two different measured events, building a value of at least one attack indicator as a function of at least said at least one index of concomitance between at least two different measured events, and detecting an attack attempt if said value of said at least one attack indicator crosses a predetermined threshold.

2. The method of claim 1, wherein said measurement of an event is limited to a sliding time slot so as to avoid taking account of events that have occurred outside said time slot.

3. The method of claim 1, wherein at least one of said measured events is detection of an error in functioning of said security processor, each occurrence of which leads said security processor to stop processing operations in progress and to be automatically reset in order to restart said operations.

4. The method of claim 1, wherein measurement of an event comprises counting, in a counter, a number of times said event has occurred, wherein a value of said counter constitutes a measurement.

5. The method of claim 1, wherein building said value of said at least one attack indicator comprises building said value out of several indices of concomitance between different measured events and weighting an importance of said indices of concomitance relative to one another using a predetermined set of weighting coefficients.

6. The method of claim 5, further comprising building a plurality of attack indicator values through use of a plurality of different sets of weighting coefficients between said indices of concomitance, each set of weighting coefficients being predetermined so as to be more sensitive to an attack attempt that is different from attack attempts to which said other attack indicators are more sensitive.

7. The method of claim 6, wherein said weighting coefficient of a same index of concomitance is the same in all the sets of weighting coefficients used to build different attack indicator values.

8. A manufacture comprising a tangible and non-transitory computer readable medium having encoded thereon software for enabling a security to detect an attempt to attack said security processor, said software comprising instructions for measuring events occurring independently of each other in absence of attack attempts; obtaining at least one index of concomitance between at least two measurements by multiplying the measurements with one another, the at least one index of concomitance representing a temporal proximity between at least two different measured events, building a value of at least one attack indicator as a function of at least said at least one index of concomitance between at least two different measured events, and detecting an attack attempt if said value of said at least one attack indicator crosses a predetermined threshold.

9. An apparatus comprising a security processor, said security processor comprising registers in which are stored measurements of several events occurring independently of one another in absence of attack attempts, and a computer configured for obtaining at least one index of concomitance between at least two measurements by multiplying said measurements with one another, said measurements being stored in said registers, said at least one index of concomitance representing a temporal proximity between different measured events, building a value of at least one attack indicator as a function of said at least one index of concomitance between at least two different measured events, and detecting an attack attempt based on whether a value of said at least one attack indicator crosses a predetermined threshold.

* * * * *